(12) United States Patent
Kaneko

(10) Patent No.: US 8,714,754 B2
(45) Date of Patent: May 6, 2014

(54) PROJECTOR HAVING CONDITION INDICATING UNIT FOR DISPLAYING SPECIFIED FOCUSING CONDITION AND CONTROL METHOD OF PROJECTOR

(75) Inventor: Eiji Kaneko, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 838 days.

(21) Appl. No.: 12/497,804

(22) Filed: Jul. 6, 2009

(65) Prior Publication Data

US 2010/0026972 A1   Feb. 4, 2010

(30) Foreign Application Priority Data

Jul. 30, 2008 (JP) ................................. 2008-195854

(51) Int. Cl.
*G03B 21/14* (2006.01)
(52) U.S. Cl.
USPC ................................ 353/101; 353/69; 353/70
(58) Field of Classification Search
USPC ................. 353/101, 121, 122, 30, 69, 70, 76; 352/139, 140; 348/346, 375
See application file for complete search history.

(56) References Cited

U.S. PATENT DOCUMENTS

| | | | |
|---|---|---|---|
| 3,560,647 A * | 2/1971 | Harmon ......................... | 353/101 |
| 4,382,665 A * | 5/1983 | Eguchi et al. ................. | 348/353 |
| 5,625,415 A | 4/1997 | Ueno et al. | |
| 5,742,358 A * | 4/1998 | Iijima et al. ................... | 348/789 |
| 6,885,819 B2 | 4/2005 | Shinohara | |
| 2006/0109426 A1* | 5/2006 | Williams ........................ | 353/69 |
| 2007/0002287 A1* | 1/2007 | Matsumoto et al. ............ | 353/85 |

FOREIGN PATENT DOCUMENTS

| | | |
|---|---|---|
| JP | 06-303487 | 10/1994 |
| JP | 06-331881 | 12/1994 |
| JP | 2001-255452 | 9/2001 |
| JP | 2003-241070 | 8/2003 |
| JP | 2005-140943 | 6/2005 |
| JP | 2005-284156 | 10/2005 |
| JP | 2006-285016 A | 10/2006 |
| JP | 2007-264335 A | 10/2007 |

* cited by examiner

*Primary Examiner* — Francis M Legasse, Jr.
*Assistant Examiner* — Bao-Luan Le
(74) *Attorney, Agent, or Firm* — ALG Intellectual Property, LLC

(57) ABSTRACT

A projector which projects projection light representing an image onto a projection surface, includes: a focus adjusting unit which shifts focus of the projection light according to operation by a user; an adjustment image projecting unit which projects an adjustment image containing a portion representing a predetermined pattern by the projection light; an imaging unit which shoots the projection surface to which the adjustment image is projected; a specifying unit which specifies a focusing condition of the focus on the projection surface by analyzing image data that is shot by the imaging unit; and a condition indicating unit which displays the specified focusing condition.

15 Claims, 9 Drawing Sheets

PROJECTOR HAVING CONDITION INDICATING UNIT FOR DISPLAYING SPECIFIED FOCUSING CONDITION AND CONTROL METHOD OF PROJECTOR

The entire disclosure of Japanese Patent Application No. 2008-195854 filed Jul. 30, 2008 is expressly incorporated by reference herein.

BACKGROUND

1. Technical Field

The present invention relates to a projector and a control method of a projector.

2. Related Art

A projector which projects projection light representing images on a projection screen has been used. The distance between the projector and the projection screen is variable. Thus, the projector of a type capable of moving focus of projection light has been developed. Known technologies for shifting (adjusting) focus include manual focus adjustment technology and automatic focus adjustment technology (for example, see JP-A-6-303487, JP-A-6-331881, JP-A-2001-255452, JP-A-2003-241070, JP-A-2005-140943, and JP-A-2005-284156).

In case of manual focus adjustment by a user, however, the user cannot easily adjust focus with high accuracy.

SUMMARY

It is an advantage of some aspects of the invention to provide a technology for easy and accurate focus adjustment by a user.

The invention can be realized in the following aspects or embodiments.

A first aspect of the invention is directed to a projector which projects projection light representing an image onto a projection surface including: a focus adjusting unit which shifts focus of the projection light according to manual operation; an adjustment image projecting unit which projects an adjustment image containing a portion representing a predetermined pattern by the projection light; an imaging unit which shoots the projection surface to which the adjustment image is projected; a specifying unit which specifies a focusing condition of the focus on the projection surface by analyzing image data that is shot by the imaging unit; and a condition indicating unit which displays the specified focusing condition.

According to this structure, image data representing the projection surface to which the adjustment image containing the pattern portion showing the predetermined pattern is projected is used for specifying the focusing condition of the focus on the projection surface. Thus, the accuracy of specifying the focusing condition increases. Accordingly, the user can easily adjust the focus with high accuracy based on the indication of the specified focusing condition.

A second aspect of the invention is directed to the projector of the first aspect, wherein the specifying unit calculates index showing the focusing condition and variable with shift of the focus by analyzing the image data. The condition indicating unit indicates the index. The imaging unit repeats shooting the image. The specifying unit calculates the index based on each of the shot images. The condition indicating unit repeatedly updates the index to be indicated according to the calculated index.

According to this structure, the user can easily adjust the focus with high accuracy by controlling the focus with reference to changes of the indicated index.

A third aspect of the invention is directed to the projector of the second aspect, wherein the index shows (A) intensity of a predetermined color component represented by the image data and obtained in a predetermined range of spatial frequency, and (B) degree of contrast in the image data.

According to this structure, the user refers to the index appropriately indicating the degree of correspondence between the focus position and the projection surface position. Thus, the user can easily adjust the focus with high accuracy.

A fourth aspect of the invention is directed to the projector of the first aspect, wherein the specifying unit specifies (A) a first position of the projection surface by analyzing the image data, and (B) a second position of the focus associated with a current adjustment setting of the focus adjusting unit. The condition indicating unit indicates the distance between the first position and the second position. The specifying unit repeatedly specifies the second position. The condition indicating unit repeatedly updates the distance to be indicated according to the specified second position.

According to this structure, the user can easily adjust the focus with high accuracy by controlling the focus such that the distance between the first position and the second position decreases.

A fifth aspect of the invention is directed to the projector of the fourth aspect, wherein the condition indicating unit further indicates which of the first position and the second position is closer to the projector.

According to this structure, the user can easily check the direction in which the focus is to be adjusted based on which of the first position and the second position is closer to the projector. Thus, the user can easily adjust the focus with high accuracy.

A sixth aspect of the invention is directed to the projector of any of the first to fifth aspects, wherein the adjustment image projecting unit projects the adjustment image in response to manual operation of the focus adjusting unit.

According to this structure, the adjustment image can be projected in response to manually adjustment of the focus by the user. Thus, the user can easily adjust the focus with high accuracy.

A seventh aspect of the invention is directed to the projector of any of the first to sixth aspects, wherein the predetermined pattern contains a first region and a second region alternately disposed and having different intensities of predetermined color component.

According to this structure, the predetermined pattern contains the first region and the second region alternately disposed and having different intensities of the predetermined color component. Thus, the image data considerably varies according to changes of the focus position. As a result, the accuracy of specifying the focusing condition improves. Accordingly, the user can easily adjust the focus with high accuracy based on the indication of the specified focusing condition.

An eighth aspect of the invention is directed to the projector of any of the first to seventh aspects, wherein the condition indicating unit updates the adjustment image to an image containing a condition indicating portion representing the specified focusing condition and a portion showing the predetermined pattern to indicate the focusing condition.

According to this structure, the user can check the focusing condition by observing the adjustment image actually projected. Thus, the user can easily adjust the focus with high accuracy.

A ninth aspect of the invention is directed to the projector of any of the first to eighth aspects, wherein the projector further includes an indication device. The condition indicating unit indicates the focusing condition on the indication device.

According to this structure, the user can check the focusing condition by observing the indication of the indication device when the projected image is blurring. Thus, the user can easily adjust the focus.

A tenth aspect of the invention is directed to a method for controlling a projector which projects projection light representing an image onto a projection surface and includes a focus adjusting unit for shifting focus of the projection light according to manual operation including: projecting an adjustment image containing a portion representing a predetermined pattern by the projection light; shooting the projection surface to which the adjustment image is projected to produce image data; specifying focusing condition of the focus on the projection surface by analyzing the image data; and displaying the specified focusing condition.

The invention can be realized in various forms such as a projector and a control method of a projector, a computer program for providing functions of this method or device, and a recording medium recording this computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described in the following order:
A. First Embodiment
B. Second Embodiment
C. Modified Example

A. First Embodiment

Figure 1:
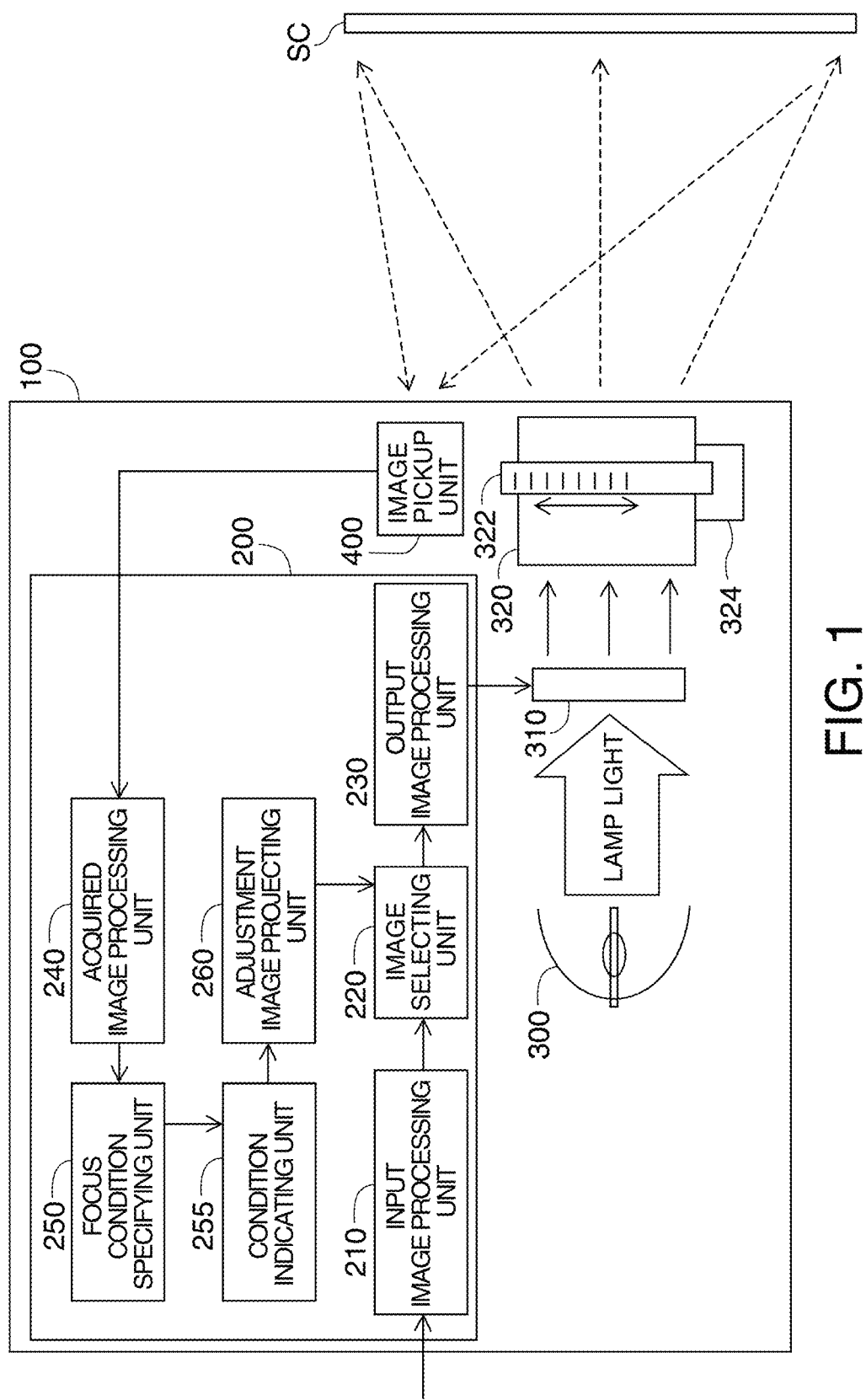
FIG. 1 illustrates a projector according to an embodiment of the invention.

FIG. 1 illustrates a projector according to an embodiment of the invention. A projector 100 is an image display apparatus which projects projection light representing images according to image signals to display images on a projection surface such as screen SC. The projector 100 includes a display control unit 200, a light source 300, a liquid crystal light valve 310, a projection system 320, and an imaging unit 400.

The light source 300 is a light source for emitting projection light. The light source 300 is constituted by various types of light source lamp such as a high pressure mercury lamp, a halogen lamp, and a metal halide lamp. The light source 300 is not limited to these light source lamps but may be other light sources such as a light emitting diode and a laser diode.

The liquid crystal light valve 310 has a plurality of pixels, and drives the pixels by driving voltage supplied from the display control unit 200 (output image processing unit 230). The liquid crystal light valve 310 modulates illumination light emitted from the light source 300 into projection light representing images by operating liquid crystals according to the driving voltage. In this embodiment, the liquid crystal light valve 310 includes three light valves for three color components of red (R), green (G), and blue (B) (not shown). The display control unit 200 controls the respective light valves for R, G and B. It is possible, however, to use a single liquid crystal light valve for projecting monochrome images.

The projection system 320 projects projection light on the projection screen (such as screen SC). The projection system 320 includes a plurality of not-shown lenses, a focus ring 322 for shifting focus of projection light (also referred to as image forming point), and a detecting unit 324 for detecting movement of the focus ring 322. The focus ring 322 is mechanically connected with one or plural lenses contained in the projection system 320. When the user rotates the focus ring 322, the positions of the lenses contained in the projection system 320 change to shift the focus of projection light. By this method, the focus can be positioned on the projection screen for any distance between the screen surface (such as screen SC) and the projector 100. The focus ring 322 corresponds to a "focus adjusting unit".

The imaging unit 400 is an image pickup device which picks up images (shoots images) of the screen surface (such as screen SC) to produce image data. In this embodiment, the imaging unit 400 is constituted by a CCD (charge coupled device) camera. The imaging unit 400 is not limited to the CCD camera but may be other types of image pickup device such as a CMOS camera. The image data to be produced may be either color image data or monochrome image data represented by predetermined color components (such as luminance).

The display control unit 200 controls respective components in the projector 100. The display control unit 200 includes an input image processing unit 210, an image selecting unit 220, the output image processing unit 230, an acquired image processing unit 240, a focus condition specifying unit 250, a condition indicating unit 255, and an adjustment image projecting unit 260. The respective elements of the display control unit 200 are constituted by hardware such as dedicated devices and circuits.

The input image processing unit 210 converts video signals (image signals) supplied to the display control unit 200 into digital data processable by the display control unit 200. The input image processing unit 210 performs processes such as A/D conversion (analog/digital conversion) and I/P conversion (interlace progressive conversion). The input image processing unit 210 supplies converted data to the image selecting unit 220. The display control unit 200 is connected with a not-shown image supply apparatus (such as a DVD reproduction apparatus and a personal computer). The image supply apparatus supplies video signals (image signals) to the display control unit 200 (input image processing unit 210). The video signals (image signals) are constituted by various types of signals such as composite signals, component signals, and digital signals.

The image selecting unit 220 selects images to be projected. In this embodiment, the image selecting unit 220 selects either images supplied from the input image processing unit 210 or adjustment images described later. The image selecting unit 220 supplies image data representing selected images to the output image processing unit 230.

The output image processing unit 230 drives (applies driving voltage to) the liquid crystal light valve 310 according to image data received from the image selecting unit 220. As a result, images selected by the image selecting unit 220 are displayed on the screen SC. The output image processing unit 230 may perform process for controlling colors such as gamma correction and VT correction. Gamma correction is a process for controlling gamma characteristics of brightness. VT correction is a process for correcting image data (such as gradations of R, G, and B components) according to non-linear input/output characteristics peculiar to the liquid crystal light valve 310.

Image signals supplied to the display control unit 200 from the not-shown image supply apparatus represent plural images disposed in time series order (referred to as frame images as well). Frame images projected on the screen SC are updated according to image signals. AS a result, the plural frame images disposed in time series order are projected in the same order.

The acquired image processing unit 240, the focus condition specifying unit 250, the condition indicating unit 255, and the adjustment image projecting unit 260 perform processes using the image data created by the imaging unit 400. These processes are for assisting the user adjusting focus of projection light by operating the focus ring 322 (hereinafter referred to as "assist process"). The acquired image processing unit 240 converts the image data produced by the imaging unit 400 into image data appropriate for processing by the focus condition specifying unit 250. For example, the acquired image processing unit 240 executes gamma correction. The focus condition specifying unit 250 analyzes the image data received from the acquired image processing unit 240 to specify the focusing condition of the focus. The focusing condition refers to on what position projection light is focused. The condition indicating unit 255 produces adjustment image representing the specified focusing condition using the adjustment image projecting unit 260. The adjustment image projecting unit 260 supplies the produced adjustment image to the image selecting unit 220. The adjustment image is selected by the image selecting unit 220 and displayed on the screen SC.

Figure 2:
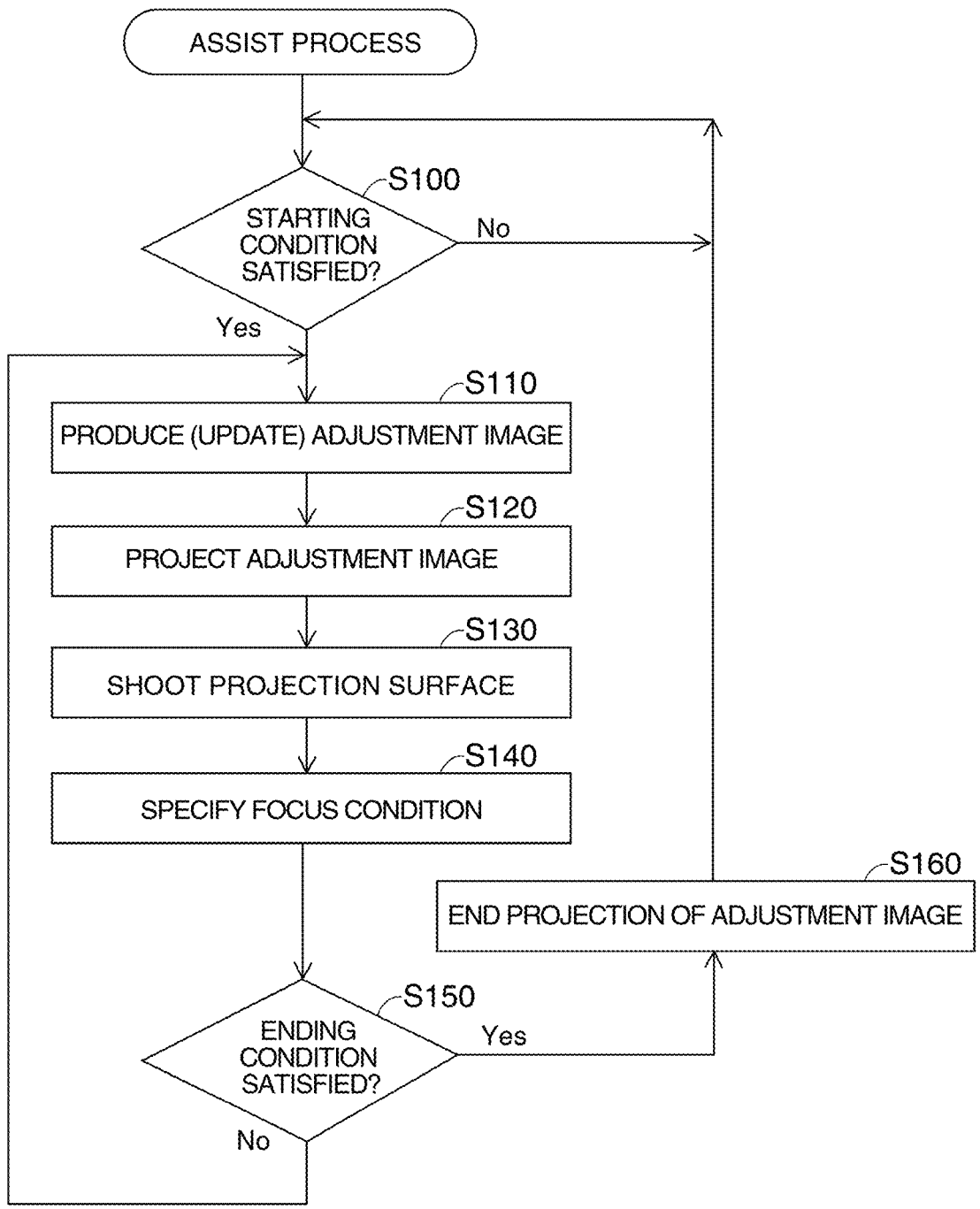
FIG. 2 is a flowchart showing procedure of an assist process.

FIG. 2 is a flowchart showing the procedure of the assist process. In step S100, the adjustment image projecting unit 260 (FIG. 1) judges whether the condition for starting the assist process is satisfied or not (hereinafter referred to as "starting condition"). In this embodiment, the starting condition is operation of the focus ring 322 by the user. That is, the assist process starts when the user initiates control of the focus. The adjustment image projecting unit 260 judges whether the starting condition is satisfied or not based on an output signal from the detecting unit 324. When the starting condition is not satisfied, the adjustment image projecting unit 260 returns to step S100.

Figure 3A:
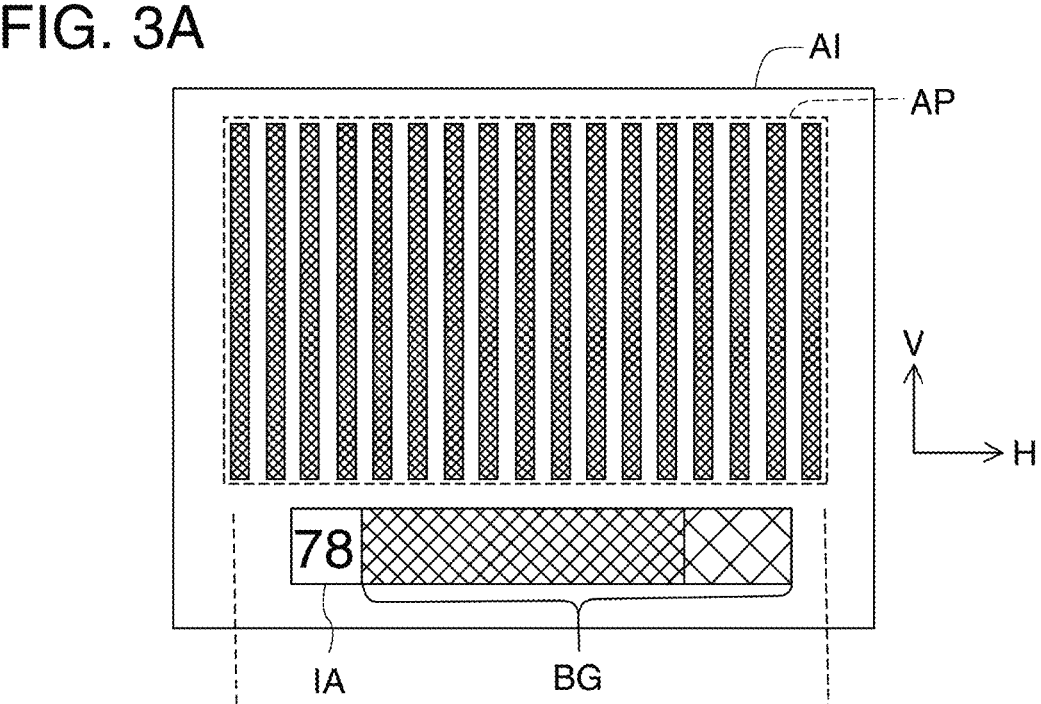
FIG. 3 illustrates an adjustment image AI.
Figure 3B:
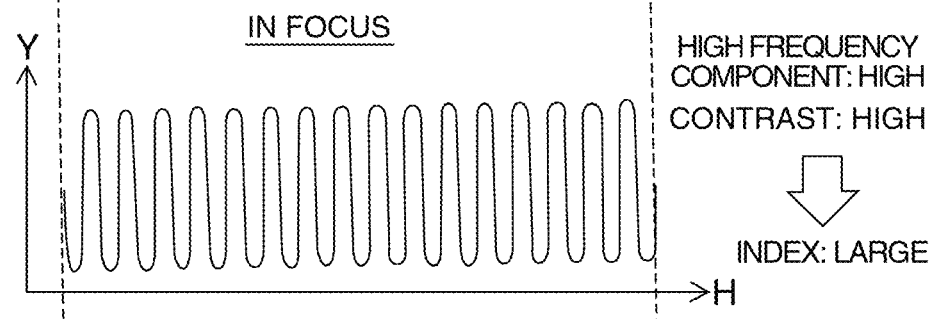
Figure 3C:
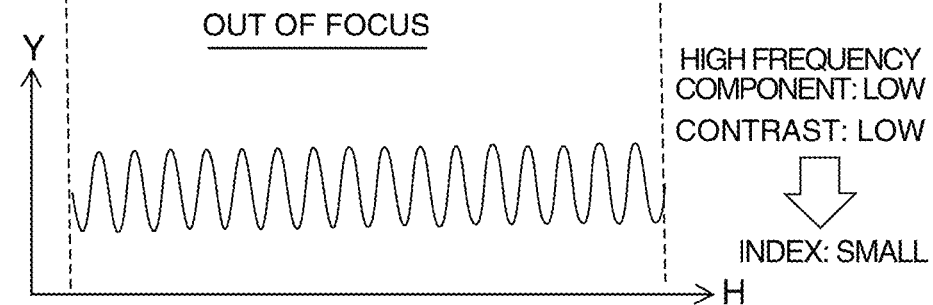

When the starting condition is satisfied, the adjustment image projecting unit 260 produces image data representing adjustment images in the subsequent step S110. A part (A) in FIG. 3 illustrates an adjustment image AI. In this embodiment, the adjustment image AI shows an adjustment pattern AP, an index area IA, and a bar graph BG. The adjustment pattern AP has a pattern containing bright regions (not hatched regions) and dark regions (hatched regions) alternately disposed in a horizontal direction H. The color of the bright regions is white as the brightest color. The color of the dark regions is black as the darkest color. The respective shapes of the bright regions and dark regions are rectangular shapes extending in the horizontal direction H and a vertical direction V perpendicular to the horizontal direction H. The adjustment pattern AP is determined in advance.

The index area IA shows index indicating the focusing condition of focus on the projection surface (such as screen SC) by using numerical numbers. The bar graph BG shows the degree of the index. As will be described later, the index is calculated based on the shot result of the adjustment image AI displayed on the projection screen. The index area IA and the bar graph BG may be eliminated from the adjustment image AI by the adjustment image projecting unit 260 before calculation of the index. Alternatively, the adjustment image projecting unit 260 may produce the adjustment image AI containing the index area AI and the bar graph BG while setting the index at a predetermined value (such as zero). The index area IA and the bar graph BG correspond to "a condition indicating portion representing focusing condition". As will be described later, the index area IA and the bar graph BG are updated by the condition indicating unit 255.

In the subsequent step S120 shown in FIG. 2, the adjustment image projecting unit 260 (FIG. 1) projects the adjustment image AI thus produced. More specifically, the adjustment image projecting unit 260 supplies image data showing the adjustment image AI and a command for selecting the adjustment image AI to the image selecting unit 220. The image selecting unit 220 selects the adjustment image AI in response to the command, and supplies image data showing the adjustment image AI to the output image processing unit 230. As a result, the adjustment image AI is displayed on the projection screen (screen SC in this embodiment).

Figure 4:
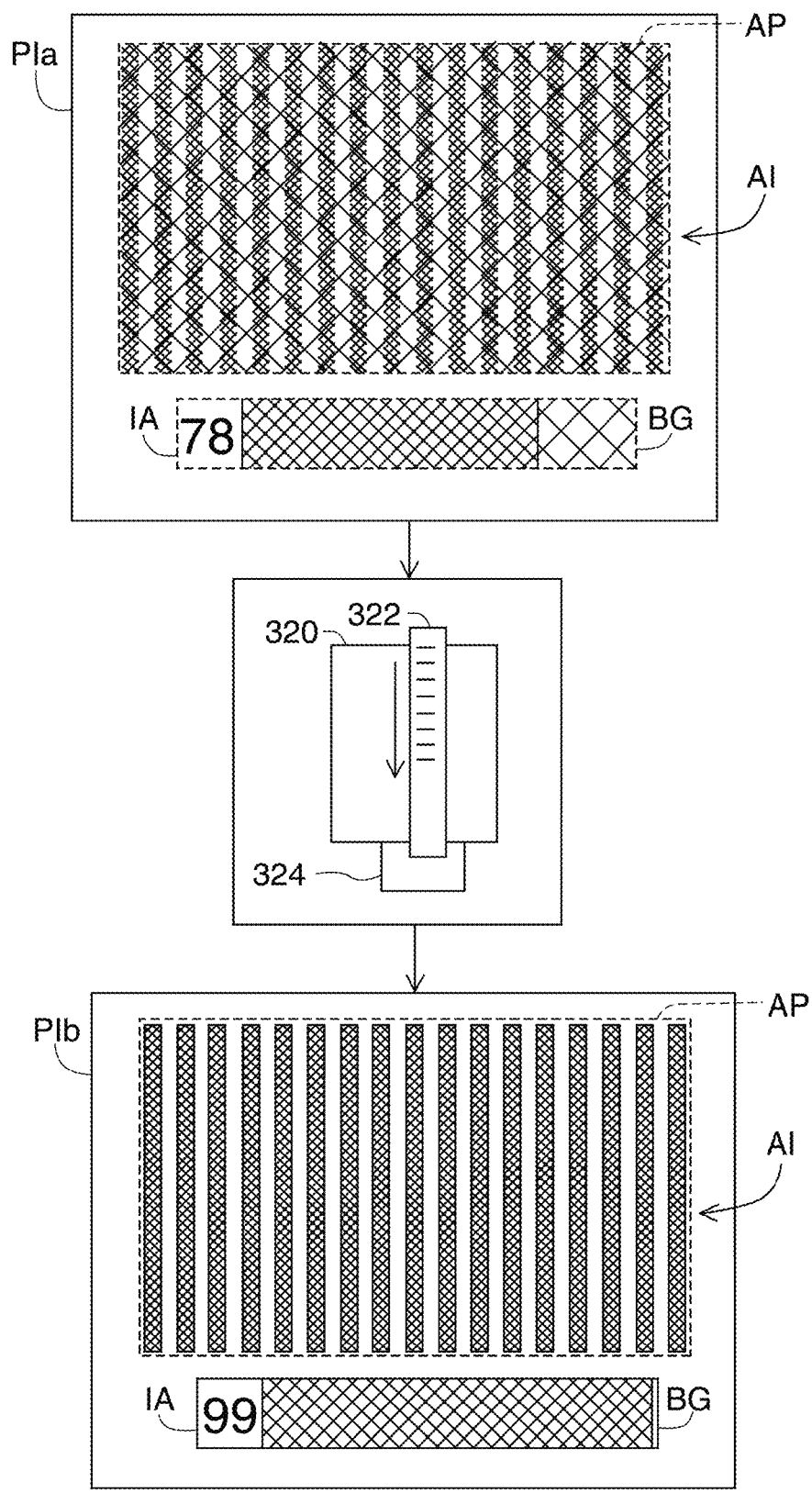
FIG. 4 illustrates a shot image.

In the subsequent step S130, the adjustment image projecting unit 260 (FIG. 1) issues a command for image shooting to the imaging unit 400. The imaging unit 400 shoots the projection surface in response to the command to produce image data showing the projection surface. FIG. 4 shows a first image PIa thus shot. The shot first image PIa contains the adjustment image AI. The produced image data is supplied to the focus condition specifying unit 250 via the acquired image processing unit 240.

In the subsequent step S140 in FIG. 2, the focus condition specifying unit 250 (FIG. 1) analyzes the received image data to calculate the index showing the focusing condition of the focus on the projection surface. This index shows the degree of correspondence between the position of the focus and the position of the projection surface (such as screen SC).

Parts (B) and (C) in FIG. 3 show the outline of the index. These parts show curves (graphs) representing variations of luminance Y on the adjustment pattern AP in the horizontal direction H. The horizontal axis indicates positions on the adjustment pattern AP in the horizontal direction H contained in the shot image (such as first image PIa in FIG. 4). The vertical axis indicates the luminance Y on the shot image. The focus condition specifying unit 250 (FIG. 1) obtains the luminance Y curve by analyzing the image data. Then, the focus condition specifying unit 250 disassembles the curve by spatial frequency to calculate intensity distribution, and then integrates intensities of spatial frequency components higher than a predetermined threshold. The integrated value is hereinafter referred to as "high frequency intensity" as well. As will be described later, the index increases as the high frequency intensity increases. The spatial frequency corresponds to the inverse number of the "distance corresponding to one cycle (pixel number)". The highest value of the spatial frequency represented by the shot image is a frequency showing one cycle by two pixels. Thus, integration of intensities is performed within the range up to the highest value in this embodiment though the upper limit of the spatial frequency is not determined.

The part (B) in FIG. 3 shows the condition of the focus positioned on the projection surface. In this condition, the boundaries between the bright regions and dark regions are clearly shown on the adjustment pattern AP projected on the screen SC. In this case, the luminance Y becomes substantially constant within each of the bright regions and dark regions, and varies almost vertically on the boundaries between the bright regions and dark regions. As a result, high frequency intensity and contrast increase.

The part (C) in FIG. 3 shows the condition of the focus shifted from the projection surface. In this condition, the areas close to the boundaries between the bright regions and dark regions are shown by mixture of white and black. In this case, the luminance Y of the areas close to the boundaries within the bright regions is lower than that in the condition where the focus is positioned on the projection surface. Also, the luminance Y of the areas close to the boundaries within the dark regions is higher than that in the condition where the focus is positioned on the projection surface. The area of mixture of white and black positioned away from the boundaries increases as the focus shifts from the projection surface. Thus, variation of the luminance Y decreases as the focus shifts from the projection surface, and the luminance Y curve becomes smoother. As a result, high frequency intensity and contrast decrease.

The high frequency intensity becomes the maximum when the focus position completely coincides with the projection surface. Thus, the focus condition specifying unit 250 (FIG. 1) calculates the proportion of the high frequency intensity to the reference value indicating the maximum as the index (by percent). The reference value is determined in advance through experimentation. It is possible to use high frequency intensity obtained by analyzing the adjustment pattern AP on the adjustment image AI as the reference value.

The focus condition specifying unit 250 (FIG. 1) supplies the calculated index to the condition indicating unit 255.

In the subsequent step S150 in FIG. 2, the adjustment image projecting unit 260 (FIG. 1) judges whether the condition for ending the assist process is satisfied or not (hereinafter referred to as "ending condition"). In this embodiment, the ending condition is passage of a predetermined time (such as 10 seconds) after the user stops operation of the focus ring 322. The adjustment image projecting unit 260 judges whether the ending condition is satisfied or not based on the output signal from the detecting unit 324. When the ending condition is satisfied, the adjustment image projecting unit 260 ends projection of the adjustment image in the subsequent step S160, and returns to step S100. In step S160, the adjustment image projecting unit 260 issues a command for selecting the image supplied from the input image processing unit 210 to the image selecting unit 220.

When the ending condition is not satisfied, the adjustment image projecting unit 260 (FIG. 1) returns to step S110. In step S110, the condition indicating unit 255 updates the adjustment image AI (part (A) in FIG. 3) using the index received from the focus condition specifying unit 250. More specifically, the condition indicating unit 255 updates the numeral in the index area IA to the numeral corresponding to the index, and updates the bar graph BG to the graph corresponding to the index. The adjustment image projecting unit 260 produces image data showing the updated adjustment image AI and supplies the produced image data to the image selecting unit 220.

Then, the display control unit 200 (FIG. 1) repeats the processes in steps S110 through S140 until the ending condition is satisfied. As a result, the projector 100 displays the adjustment image AI (part (A) in FIG. 3) showing the current focusing condition of the focus on the screen SC. The user can easily check the focusing condition by observing the adjustment image AI thus displayed. Then, the user can easily adjust the focus with high accuracy by operating the focus ring 322 (FIG. 1) such that the indicated index increases.

For example, the first image PIa illustrated in FIG. 4 shows the condition of the focus shifted from the projection surface. In the first image PIa, the adjustment pattern AP is blurring. Also, the index shown in the index area IA and the bar graph BG is smaller than the maximum value (100%). When this image is displayed, the user operates the focus ring 322 such that the index increases. The second image PIb illustrated in FIG. 4 shows the image shot after operation of the focus ring 322 by the user. In the second image PIb, the adjustment pattern AP is clearly shown, and the index is close to the maximum value. Thus, the user can easily check that the focus is positioned on the projection surface. Accordingly, the user can easily adjust focus with high accuracy by controlling the focus by referring to variations of the displayed index.

According to this embodiment, the ending condition is passage of the predetermined time after the user stops operation of the focus ring 322 (FIG. 1). Thus, the user only needs to stop operation of the focus ring 322 after confirming that the focus is positioned on the projection surface for stopping the assist process. In response to the end of the assist process, the display control unit 200 automatically ceases to project the adjustment image and starts projection of the image supplied from the input image processing unit 210.

As shown in the part (A) in FIG. 3, the bright regions and dark regions of the adjustment pattern AP extend in the vertical direction V. According to this embodiment, therefore, the focus condition specifying unit 250 (FIG. 1) uses the average of the luminance values of the plural pixels located at the same positions in the horizontal direction H (that is, plural pixels disposed in a line in the vertical direction V) on the adjustment pattern AP as the luminance Y at a certain position in the horizontal direction H. The luminance Y is not limited to the average but may be various values represented by function of luminance of plural pixels (such as central value). Also, the luminance Y may be luminance on a predetermined one pixel line extending in the horizontal direction H, or luminance on plural pixel lines.

The focus condition specifying unit 250 (FIG. 1) calculates the index assuming that the adjustment pattern AP is shown at a predetermined position within the shot image. However, the focus condition specifying unit 250 may detect the adjustment pattern AP on the image by various methods such as pattern matching.

B. Second Embodiment

Figure 5:
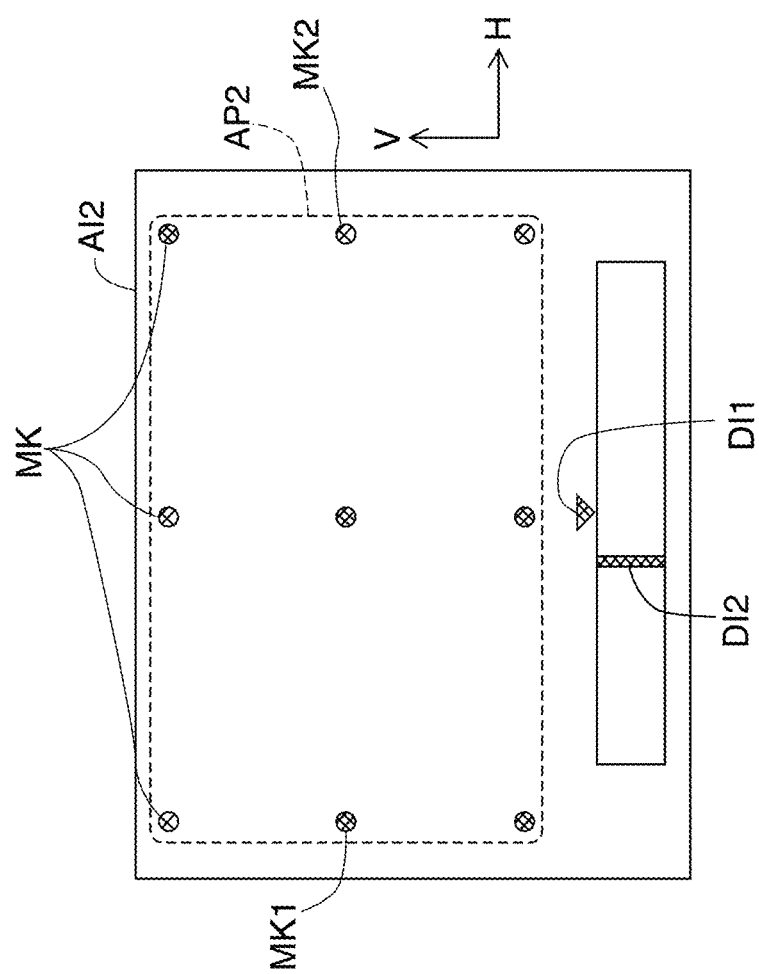
FIG. 5 illustrates an adjustment image according to another embodiment.

FIG. 5 illustrates an adjustment image according to another embodiment. There are two differences between this adjustment image and the adjustment image AI shown in the part (A) in FIG. 3. The first difference is that an adjustment pattern AP2 of an adjustment image AI2 shows a white background region (not hatched region) and plural markers MK disposed at predetermined positions in the background region. In this embodiment, the markers MK are circles each of which has black color all over. According to the example shown in FIG.

5, the nine markers MK are disposed in matrix 3*3. The adjustment pattern AP2 is determined in advance. The second difference is that the adjustment image AI2 contains a first position indicating portion DI1 and a second position indicating portion DI2 in place of the index area IA and the bar graph BG. The first position indicating portion DI1 indicates the position of the projection surface with respect to the projector. The second position indicating portion DI2 indicates the position of the focus of projection light with respect to the projector. The projector using the second adjustment pattern AP2 in the second embodiment has a structure similar to that of the projector 100 shown in FIG. 1. According to the second embodiment, the display control unit 200 performs the assist process by the procedure shown in FIG. 2. However, steps S110 and S140 in the second embodiment are different from those in the first embodiment. Other steps are similar to those in the first embodiment.

In step S110 shown in FIG. 2, the adjustment image projecting unit 260 (FIG. 1) produces image data showing the adjustment image AI2. The two positions shown in the two position indicating portions DI1 and DI2 are specified by step S140 described later. The adjustment image projecting unit 260 may eliminate the two position indicating portions DI1 and DI2 from the adjustment image AI2 before specification of the positions. Alternatively, the adjustment image projection unit 260 may produce the adjustment image AI2 containing the two position indicating portions DI1 and DI2 assuming that the respective positions are located at predetermined positions. The entire area of the first position indicating portion DI1 and the second position indicating portion DI2 corresponds to a "condition indicating portion representing the focusing condition". As will be described later, the second position indicating portion DI2 is updated by the condition indicating unit 255.

In step S140 shown in FIG. 2, the focus condition specifying unit 250 (FIG. 1) analyzes the image data received from the acquired image processing unit 240 to specify the position of the projection surface (screen SC in the embodiment shown in FIG. 1) with respect to the projector 100 (hereinafter referred to as "first position" as well). The first position is a position in the direction parallel with the optical axis of the projection system 320. That is, the first position corresponds to the distance between the projector 100 and the projection surface.

Figure 6:
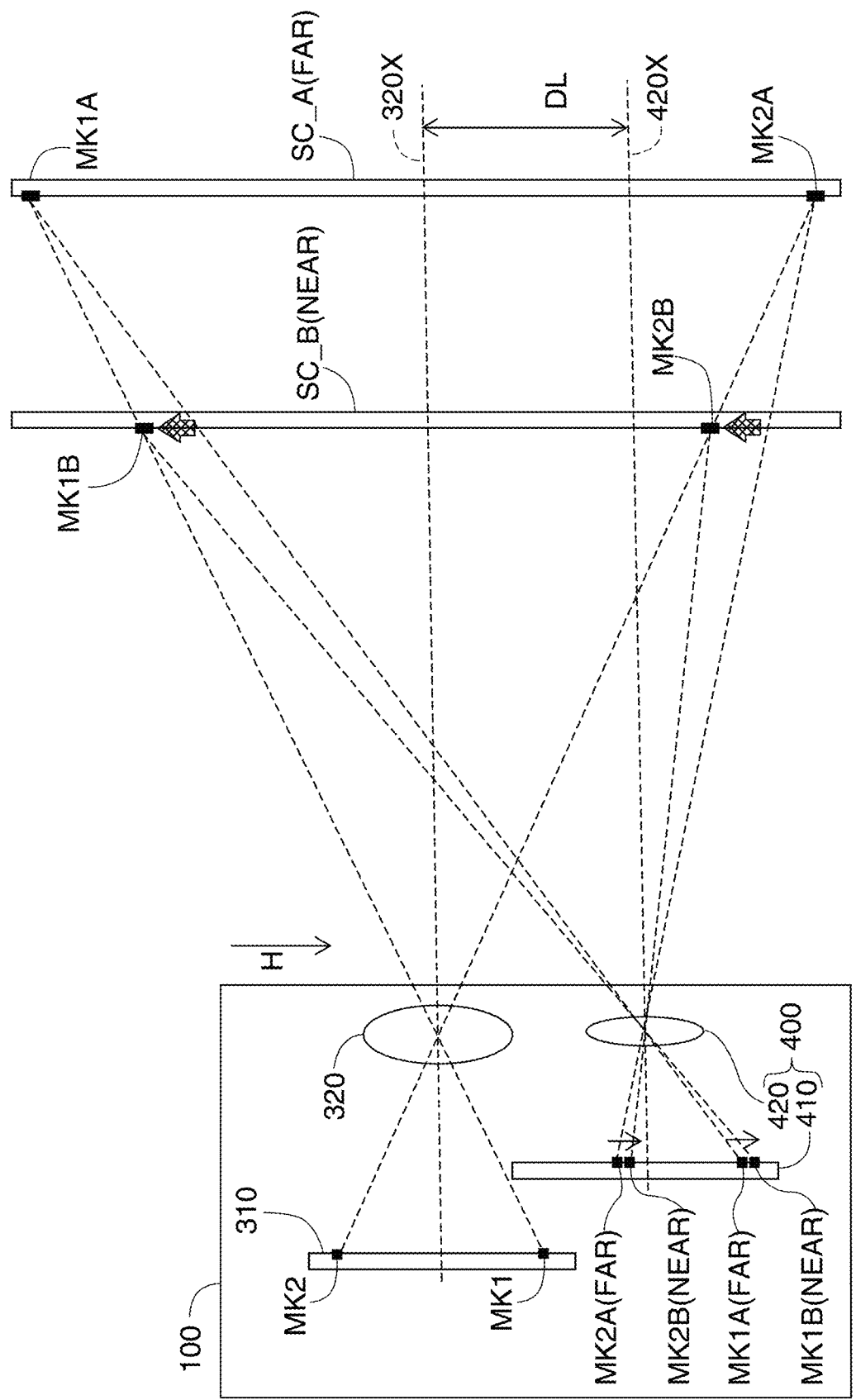
FIG. 6 shows relationship between positions and a shot image.

FIG. 6 shows the relationship between positions and the shot image. This figure illustrates the projector 100 and screens SC_A and SC_B. The distance between the first screen SC_A and the projector 100 is longer than the distance between the second screen SC_B and the projector 100.

The figure shows the liquid crystal light valve 310, the projection system 320, and the imaging unit 400 included in the components of the projector 100. The projection system 320 has a plurality of lenses, but the detailed structure is not shown in FIG. 6. In this embodiment, the imaging unit 400 is disposed on the side of the projection system 320 in the horizontal direction H. The imaging unit 400 has a CCD sensor 410 and a shooting system 420. The shooting system 420 has one or plural lenses, but the detailed structure is not shown. An optical axis 420X of the shooting system 420 is substantially parallel with an optical axis 320X of the projection system 320 (distance DL is the distance between the optical axes 420X and 320X). Thus, the imaging unit 400 faces in the same direction as that of the projection system 320.

The screen SC_A contains first marker MK1A and second marker MK2A, and the screen SC_B contains first marker MK1B and second marker MK2B as illustrated in FIG. 6. The first markers MK1A and MK1B correspond to a first marker MK1 shown in FIG. 5, and the second markers MK2A and MK2B correspond to a second marker MK2 shown in FIG. 5. As illustrated in FIG. 5, the first marker MK1 is positioned at the end in the direction opposite to the horizontal direction H of the adjustment image AI2, and the second marker MK2 is positioned at the end in the horizontal direction H of the adjustment image AI2.

The size of the displayed image decreases as the projection surface is positioned closer to the projector 100. For example, the distance between the two markers MK1B and MK2B on the second screen SC_B is shorter than the distance between the two markers MK1A and MK2A on the screen SC_A. However, since the same adjustment image AI2 is projected, the positions of the markers MK1 and MK2 do not change on the liquid crystal light valve 310 regardless of the distance between the projector 100 and the screen.

The shooting system 420 is shifted in the horizontal direction H by the distance DL larger than zero from the projection system 320 (that is, the shooting system 420 is disposed away from the optical axis 320X). When the projection surface is far from the projector 100, the image displayed on the projection surface is viewed from the imaging unit 400 in such a condition as to be located almost in front of the imaging unit 400. When the projection surface is close to the projector 100, however, the image displayed on the projection surface is viewed from the imaging unit 400 in such a condition as to be shifted from the front toward the projection system 320.

For example, the first marker MK1B on the second screen SC_B is viewed from the imaging unit 400 in such a condition as to be shifted from the first marker MK1A on the first screen SC_A toward the projection system 320 (in the direction opposite to the horizontal direction H). On the other hand, the second marker MK2B on the second screen SC_B is viewed from the imaging unit 400 in such a condition as to be shifted from the second marker MK2A on the first screen SC_A toward the projection system 320.

As can be understood, the image displayed on the projection surface is more shifted toward the projection system 320 as viewed from the imaging unit 400 as the projection surface is disposed closer to the projector 100. That is, the position of the image on the CCD sensor 410 varies according to the position of the projection surface with respect to the projector 100 (distance between the projector 100 and the projection surface). Thus, the focus condition specifying unit 250 (FIG. 1) analyzes the image data received from the acquired image processing unit 240 to specify the position of the markers MK within the shot image. The specifying method may be any of various methods such as pattern matching for specifying the positions of the markers MK within the image. Then, the focus condition specifying unit 250 specifies the position of the projection surface based on the positions of the markers MK thus specified. The correspondence between the position of the projection surface and the positions of the markers MK is determined in advance through experimentation. The focus condition specifying unit 250 may calculate the position of the projection surface according to an equation expressing the relationship between the position of the projection surface and the positions of the markers MK within the image. This equation can be obtained in a geometrical manner.

As illustrated in FIG. 5, the adjustment pattern AP2 contains the plural markers MK disposed at different positions. The focus condition specifying unit 250 (FIG. 1) specifies each position of the markers MK, and uses the average position as the position of the projection surface. Thus, the average position on the projection surface can be specified even when the projection surface (such as screen SC (FIG. 1)) is not perpendicular to the optical axis 320X of the projection system 320, for example. It is also possible to use a weighted average position having weight predetermined for each marker.

The focus condition specifying unit 250 (FIG. 1) also specifies the focus position of the projection light with respect to the projector 100 according to the output signal from the detecting unit 324 (hereinafter referred to as "second position" as well). The second position is a position in a direction parallel with the optical axis of the projection system 320. Thus, the second position corresponds to the distance between the projector 100 and the focus.

According to this embodiment, the detecting unit 324 (FIG. 1) detects the rotation position (angle) of the focus ring 322, and outputs a signal indicating the rotation position. The detecting unit 324 may be constituted by various structures. In this embodiment, the detecting unit 324 contains variable resistance whose resistance value varies according to the rotation of the focus ring 322, and an A/D converter for converting resistance values of the variable resistance into digital values. The detecting unit 324 outputs the digital values produced by the A/D converter as output signals.

The position of the focus (i.e., distance between the focus and the projector 100 (FIG. 1)) varies according to the rotation of the focus ring 322. That is, the position of the focus is determined by the rotation position of the focus ring 322. Thus, the focus condition specifying unit 250 (FIG. 1) specifies the position of the focus based on the rotation position (output signal from the detecting unit 324) of the focus ring 322. The correspondence between the rotation position and the focus is determined in advance through experimentation.

The focus condition specifying unit 250 (FIG. 1) supplies a first position (projection surface position) and a second position (focus position) to the condition indicating unit 255. The condition indicating unit 255 updates the adjustment image AI2 (FIG. 5) based on the received two positions in step S110 shown in FIG. 2. In this embodiment, the condition indicating unit 255 determines the position of the second position indicating portion DI2 based on the first position and the second position without changing the position of the first position indicating portion D11 (first position indicating portion D11 is disposed at a predetermined position within the image).

Figure 7A:
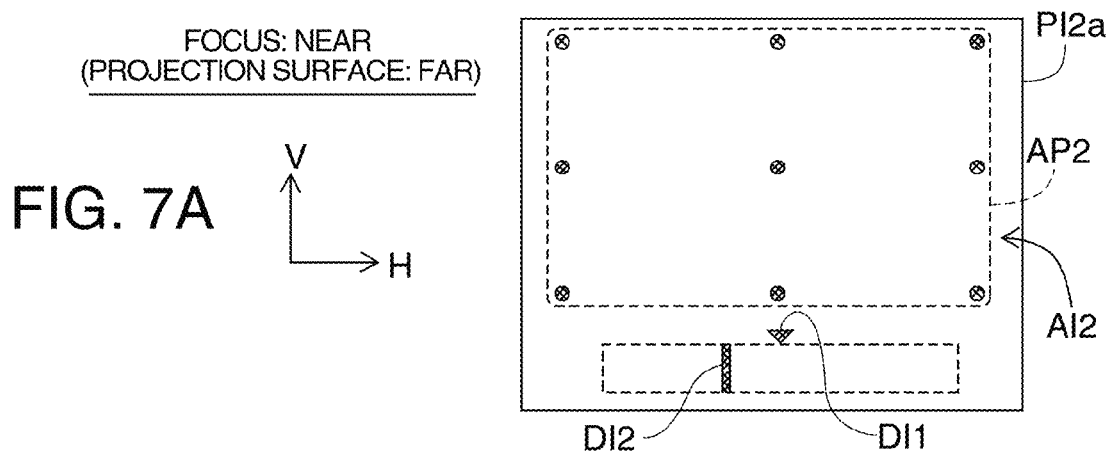
FIGS. 7A through 7C show shot images.
Figure 7B:
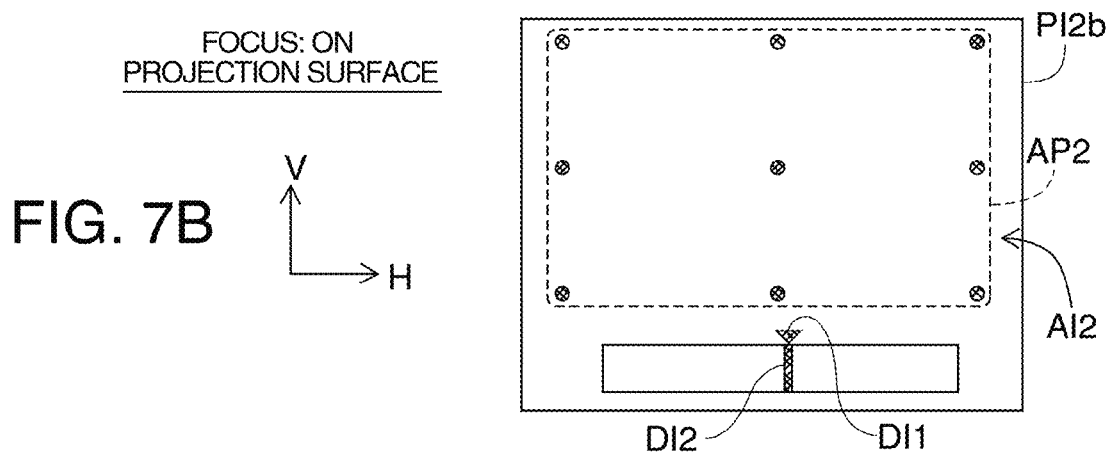
Figure 7C:
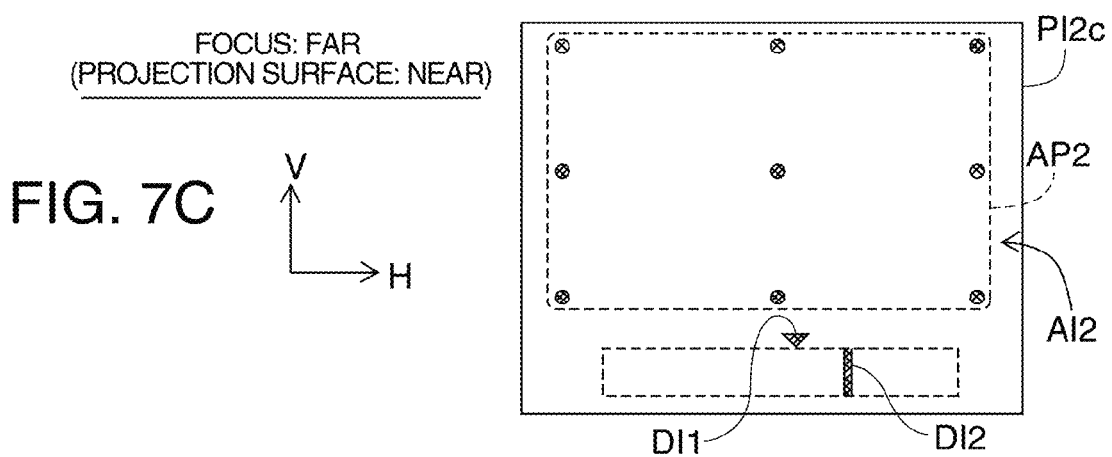

FIGS. 7A through 7C show images PI2a through PI2c shot by the imaging unit 400, respectively. The first image PI2a shown in FIG. 7A is the image when the focus is shifted toward the projector 100 (FIG. 1) from the projection surface. In this case, the second position indicating portion DI2 is shown at a position shifted toward the left from the first position indicating portion DI1.

The second image PI2b shown in FIG. 7B is the image when the focus is positioned on the projection surface. In this case, the position of the horizontal direction H of the second position indicating portion DI2 is located at the same position as that of the first position indicating portion DI1. Thus, the user can easily check that the focus is positioned on the projection surface by observing the second image PI2b.

The third image PI2c shown in FIG. 7C is the image when the focus is shifted from the projection surface in the direction away from the projector 100 (FIG. 1). In this case, the second position indicating portion DI2 is shown at a position shifted toward the right from the first position indicating portion DI1.

In any of these cases, the distance between the first position indicating portion D11 and the second position indicating portion DI2 is set in such a manner as to increase as the distance between the first position and the second position increases. Thus, the user operates the focus ring 322 such that the second position indicating portion DI2 comes closer to the first position indicating portion DI1.

According to this embodiment, therefore, the position indicating portions DI1 and DI2 of the adjustment image AI2 show the distance between the first position and the second position. Thus, the user can easily adjust the focus with high accuracy by controlling the focus such that the distance between the first position and the second position decreases.

Also, the position indicating portions DI1 and DI2 of the adjustment image AI2 indicate which of the first position and the second position is closer to the projector 100. Thus, the user can easily check the direction in which the focus is to be shifted based on which of the first position and the second position is closer to the projector 100. Accordingly, the user can easily adjust the focus with high accuracy.

The user often controls the focus without changing the positions of the projector 100 (FIG. 1) and the projection surface (such as screen SC). Thus, in one assist process, the image shooting of the projection surface may be performed by the imaging unit 400 only once without repeat, and specification of the first position based on the analysis of the shot image may be performed by the focus condition specifying unit 250 only once without repeat. In this case, the focus condition specifying unit 250 notifies the condition indicating unit 255 about the second position by repeating specification of the second position based on the current adjustment setting (i.e., rotation position) of the focus ring 322. Then, the condition indicating unit 255 repeatedly updates the adjustment image according to the specified second position. The whole of the first position (projection surface position) and the second position (focus position) indicates the current focusing condition of the focus of the projection light.

C: Modified Example

Elements other than those claimed in the independent claims included in the components according to these embodiments are only additional elements, and thus can be eliminated in an appropriate manner. The invention is not limited to the embodiments and examples described herein, but may be practiced otherwise without departing from the scope of the invention. For example, the following modifications may be made.

Modified Example 1

According to the embodiments, the adjustment image containing the pattern portion representing the predetermined pattern (such as adjustment pattern AP shown in FIG. 3 and adjustment pattern AP2 shown in FIG. 5) is used for specifying the focusing condition of the focus of the projection light. Thus, the accuracy of specifying the focusing condition of the focus is higher than that in a structure using an arbitrary image. Moreover, the image practically projected is used for the focus adjustment in projecting (displaying) images. Thus, appropriate focus adjustment can be achieved.

The pattern contained in the adjustment image in the first embodiment shown in FIG. 4 is not limited to the adjustment pattern AP shown in FIG. 3 but may be other various patterns. For example, the bright regions may have color other than the brightest color of white (such as chromatic color). Similarly, the dark regions may have color other than the darkest color of black (such as chromatic color). The pattern alternately containing the bright regions and dark regions in the vertical direction V may be used. At least either the bright regions or the dark regions may have wide regions and narrow regions. The bright regions and the dark regions may be disposed in grating pattern. It is generally preferable to use such a pattern which contains first regions and second regions alternately disposed and having different intensities of predetermined color component. When this pattern is employed, the image data produced by image shooting (particularly gradations of predetermined color component) considerably varies according to changes of the focus position of projection light. Thus, particular accuracy of the focusing condition of the focus can improve. The color component having different intensities between the first regions and the second regions is not limited to luminance but may be any color component (such as red component, green component, and blue component). It is preferable to use color component contained in the shot image for specifying the focusing condition of the focus.

The pattern included in the adjustment image according to the second embodiment shown in FIGS. 5 through 7C is not limited to the adjustment pattern AP2 shown in FIG. 5 but may be other various patterns. For example, such a pattern containing quadrangular or triangular markers may be used. The total number of the markers may be 1 or N (N: two or larger integer). The method of specifying the first position (projection surface position) from the positions of the N markers in the shot image may be selected from various methods. For example, the first position may be specified by totaling the positions of the N markers. The first position obtained by this method can be expressed as function of the positions of the N markers (this function may be various types of function such as function for obtaining the average position). Also, the same pattern as that of the first embodiment shown in FIG. 3 may be used. In this case, the position of the projection surface may be specified according to the positions of the dark regions or the bright regions in the shot image. Generally, arbitrary patterns capable of specifying the positions in the shot image can be used.

In any cases, a stack image obtained by stacking another image on at least either a predetermined pattern (adjustment pattern) or a condition indicating portion showing the focusing condition of the focus may be used as the adjustment image used for the assist process. For example, the image selecting unit 220 (FIG. 1) may supply a stack image obtained by staking a projection image received from the input image processing unit 210 on an image received from the adjustment image projecting unit 260 to the output image processing unit 230. The method of obtaining the stack image by stacking two images may be selected from various methods. For example, a pixel value of an arbitrary pixel on a stack image (such as gradation values of R, G and B) may be set at the average of the pixel values of the same pixels on the image received from the adjustment image projecting unit 260 and on the image received from the input image processing unit 210 (projection image). Alternatively, the weighted average to which a predetermined weight is added may be used instead of the simple average. For using this stack image, the focus condition specifying unit 250 obtains the pixel value indicating a predetermined pattern (adjustment pattern) by subtracting the pixel value of the projection image from the pixel value of the shot image. The correspondence between the pixel of the projection image and the pixel of the shot image is determined in advance through experimentation. The focus condition specifying unit 250 may determine this correspondence by pattern matching. The predetermined pattern and the condition indicating portion contained in the image supplied from the adjustment image projecting unit 260 can be visually recognized even in case of the stack image. It can be therefore concluded that the stack image contains the portion representing the predetermined pattern and the condition indicating portion.

Modified Example 2

In the embodiment shown in FIG. 3, the index showing the focusing condition of projection light is not limited to the value showing high frequency intensity but may be various values indicating the focus condition of the focus in the image data and variable with shift of the focus. It is preferable to use such values which become the maximum or the minimum when the focus of the projection light is positioned on the projection surface.

For example, in the embodiment shown in FIG. 3, the range of the spatial frequency for integrating the intensities in the spatial frequency distribution is not limited to the band higher than the predetermined threshold but may be a band determined by a predetermined lower limit and a predetermined upper limit. In any cases, the range of the spatial frequency is determined through experiment such that the index varies with changes of the focus position of the projection light. The index is not limited to the integration of intensities but may be various types of intensity obtained in the predetermined range of the spatial frequency. For example, the average intensity in the predetermined range of the spatial frequency may be used. Alternatively, a weighted average intensity to which weight determined in advance according to the spatial frequency is added may be employed instead of the simple average intensity. Accordingly, various types of total value of the intensities within the predetermined range can be used.

The index may be a value showing the degree of contrast in the portion representing the adjustment pattern (such as adjustment pattern AP in FIG. 3) in the shot image. As shown in the parts (A), (B) and (C) in FIG. 3, contrast increases as the focus of the projection light is positioned closer to the projection surface. Thus, the degree of contrast indicates the degree of correspondence between the focus of the projection light and the position of the projection surface. The method for calculating the degree of contrast may be selected from various known methods. For example, the degree of contrast may be a value obtained by subtracting the minimum luminance from the maximum luminance.

In any cases, the color component used for calculating the index is not limited to luminance but may be various types of color component (such as red component, green component, and blue component).

Modified Example 3

The indication of the index showing the focusing condition of the focus of the projection light according to the embodiments is not limited to numerical numbers and bar graph but may be arbitrary indication which is visually recognizable. For example, symbols having shapes variable according to index may be used. Also, either the index area IA or the bar graph BG may be eliminated from the adjustment image AI shown in the part (A) in FIG. 3.

Modified Example 4

The indication of the distance between the first position (projection surface position) and the second position (focus position) according to the embodiments is not limited to the distance between the two position indicating portions DI1 and DI2 shown in FIG. 5 but may be arbitrary indication which is visually recognizable. For example, numerical numbers or bar graph showing the distance may be used.

Modified Example 5

Indication showing which of the first position (projection surface position) and the second position (focus position) is closer to the projector according to the embodiments is not limited to the indication of the positional relationship between the two position indicating portions DI1 and DI2 but may be arbitrary indication which is visually recognizable. For example, symbols having shapes variable with the position closer to the projector.

Modified Example 6

The assist process starting condition according to the embodiments is not limited to the start of operation of the focus adjusting unit (such as focus ring 322 shown in FIG. 1) by the user but may be arbitrary condition. For example, the condition that power is supplied to the projector 100, that a not-shown assist button provided on the projector 100 is pushed, and other conditions may be employed.

The assist process ending condition is not limited to passage of the predetermined time after the user stops operation of the focus adjusting unit (such as focus ring 322 shown in FIG. 1), but may be arbitrary condition. For example, the condition that a not-shown assist button provided on the projector 100 is pushed may be employed.

Modified Example 7

The focus adjusting unit according to the embodiments is not limited to the focus ring 322 (FIG. 1) but may be various types of device capable of moving the focus of the projection light according to the operation by the user. For example, the focus adjusting unit may include a motor and an operation unit operated by the user for driving the motor (such as button). In this case, the motor may change the positions of the lenses contained in the projection system 320 (FIG. 1) according to the operation by the user.

Modified Example 8

The structure of the projector according to the embodiments is not limited to the structure shown in FIG. 1 but may be various other structures. For example, the modulating unit for modulating light emitted from the light source into projection light representing images is not limited to the liquid crystal light valve but may be various other devices. For example, DMD (digital micromirror device, trademark of TI (Texas Instruments) Co.) may be employed. The optical axis of the imaging unit 400 is not required to be parallel with the optical axis of the projection system 320. In this case, the position of the particular pattern (such as markers MK) in the shot image varies according to the position of the projection surface similarly to the example shown in FIG. 6. Thus, the focus condition specifying unit 250 can specify the position of the projection surface similarly to the example shown in FIG. 6.

Modified Example 9

Figure 8:
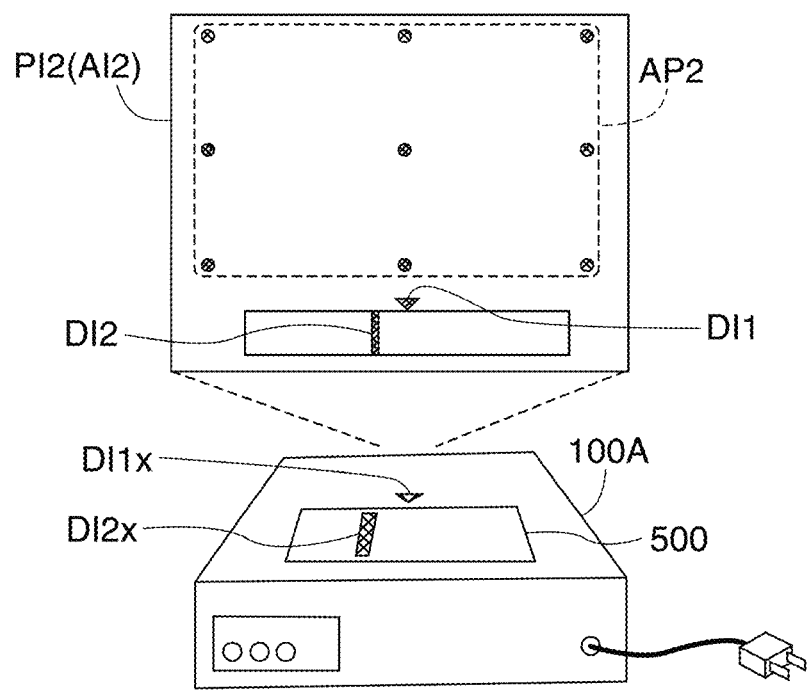
FIG. 8 illustrates a projector 100A.

The projector according to the embodiments may include an indication device which shows the focusing condition. FIG. 8 illustrates a projector 100A having this structure. The difference between the projector 100A and the projector 100 shown in FIG. 1 is only that an indication device 500 is added to the projector 100A, and other structure is the same. The projector 100A performs the assist process according to the procedure shown in FIG. 2. FIG. 8 shows the projector 100A projecting the adjustment image AI2 shown in FIG. 5. The image PI2 thus projected contains the adjustment pattern AP2 and the position indicating portions DI1 and DI2. A first position indicating portion DI1x is shown at a predetermined position (in the vicinity of the indication device 500) on the housing of the projector 100A, and a second position indicating portion DI2x is indicated on the indication device 500. In step S110 shown in FIG. 2, the condition indicating unit 255 (FIG. 1) displays the second position indicating portion DI2x on the indication device 500. In this case, the condition indicating unit 255 updates the second position indicating portion DI2x shown on the indication device 500 such that the positional relationship between the two position indicating portions DI1x and DI2x becomes equivalent to the positional relationship between the two position indicating portions DI1 and DI2. By this method, the condition indicating unit 255 displays the focusing condition on the indication device 500. The user checks the current focusing condition by observing the indication on the indication device 500. Thus, the user can easily adjust focus even when the projected image is blurring (the focus of projection light is not positioned on the projection surface).

Figure 9:
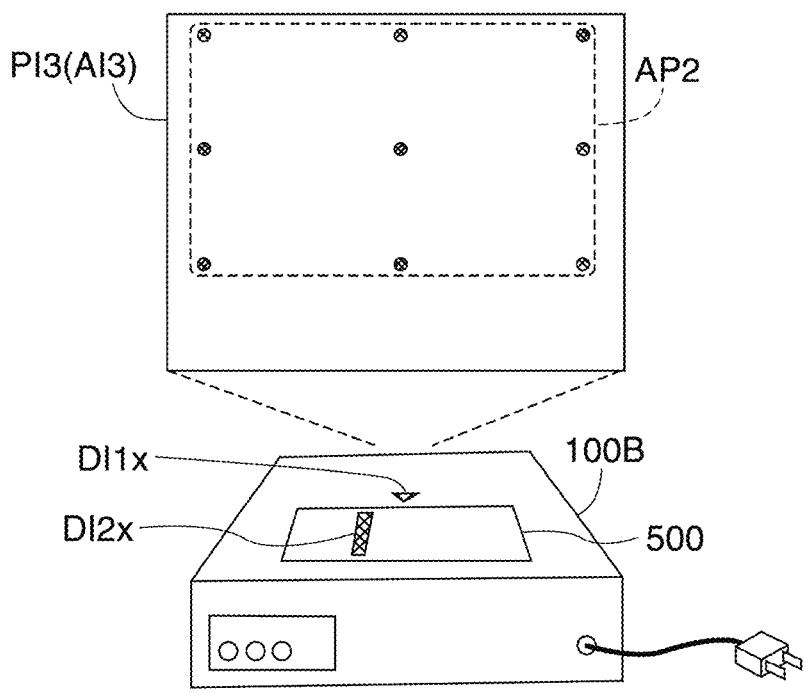
FIG. 9 illustrates a projector 100B.

Also, the projector may project an adjustment image not containing the condition indicating portion showing the focusing condition for indication of the focusing condition, and show the focusing condition only on the indication device 500. FIG. 9 illustrates a projector 100B having this structure. The difference between the projector 100B and the projector 100A shown in FIG. 8 is only that an adjustment image AI3 to be projected does not include the condition indicating portion (position indicating portions DI1 and DI2) contained in the adjustment image AI2 (FIG. 5). In this case, the focusing condition is not shown on the projection surface (projection surface image PI3) but is indicated on the indication device 500. Thus, the user can check the current focusing condition by observing the indication device 500.

When the focusing condition is indicated on both the projection surface and the indication device 500 as in the example shown in FIG. 8, the user can check the focusing condition by observing the indication device 500 when the projected image is blurring and by observing the image actually projected when the focus is close to the projection surface. Thus, the user can easily adjust focus with high accuracy under various conditions.

The indication device 500 may be constituted by any types of indication device. For example, the indication device 500 may be a display including LCD (liquid crystal display) or OLED (organic light-emitting diode), LED (light emitting diode) array or others. In any cases, the user can check the focusing condition regardless of the condition of the projection surface by using the indication device capable of indicating the contents to be indicated independently from the projection surface. The adjustment image is not limited to the image shown in FIG. 8 and FIG. 9 but may be various types of images. For example, the adjustment image AI shown in FIG. 3 may be used. In this case, it is preferable that the indication device 500 indicates at least either the indication area IA or the bar graph BG. The indication of the focusing condition by the indication device 500 may be arbitrary indication which can be visually recognized similarly to the indication of the focusing condition projected in the above embodiments.

Modified Example 10

The invention is not limited to the embodiments disclosed above. For example, an indicator for showing the focusing status is able to be implemented in the image supply apparatus (not-shown). In this case, a personal computer may be suitable as the image supply apparatus. The projector may send information corresponding to the focus condition to the personal computer through a not-shown communication means. Several means for communication are available. For instance, an radio LAN, cable LAN, Universal Serial Bus (USB), IEEE1394, and so on may be preferable as the communication means. The personal computer may receive the information and may graphically display the focus condition to a display monitor.

Modified Example 11

A part of the structure provided by hardware in the embodiments may be provided by software, and a part or the whole of the structure provided by software may be provided by hardware. For example, the function of the adjustment image projecting unit 260 shown in FIG. 1 may be provided by a computer performing programs.

When a part or the whole of the functions according to the invention are provided by software, the software (computer program) is stored in a recording medium readable by a computer. The "recording medium readable by a computer" according to the invention is not limited to a portable type recording medium such as flexible disk and CD-ROM but includes internal memory device contained in a computer such as various types of RAM and ROM, and external memory device fixed to a computer such as hard disk.

What is claimed is:

1. A projector which projects projection light representing an image onto a projection surface, comprising:
a focus adjusting unit which adjusts focus of a projected image according to manual operation;
an adjustment image projecting unit which projects an adjustment image containing a portion representing a predetermined pattern on the projection surface;
an imaging unit which captures the adjustment image;
a specifying unit which specifies a focusing condition of the adjustment image by analyzing image data of the adjustment image captured by the imaging unit; and
a condition indicating unit which displays the specified focusing condition as part of the adjustment image,
wherein the adjustment image projecting unit projects the adjustment image in response to manual operation of the focus adjusting unit and stops projecting the adjustment image if a detection unit detects no movement during passage of a predetermined time after the last manual operation for the focus adjusting unit, and
wherein the adjustment image includes:
a first portion that indicates the specified focusing condition numerically, and
a second portion that shows the predetermined pattern to indicate the focusing condition.

2. The projector according to claim 1, wherein:
the specifying unit calculates an index analyzing the image data, the index including a variable indicative of a current focusing condition and configured to change the variable in response to adjusting focus of the adjustment image;
the condition indicating unit indicates the index;
the imaging unit repeats capturing the image;
the specifying unit calculates the index based on each of the captured images; and
the condition indicating unit repeatedly updates the index to be indicated according to the calculated index.

3. The projector according to claim 1, wherein:
the specifying unit specifies
(A) a first position of the projection surface by analyzing the image data, and
(B) a second position of the focus associated with a current adjustment setting of the focus adjusting unit;
the condition indicating unit indicates the distance between the first position and the second position;
the specifying unit repeatedly specifies the second position; and
the condition indicating unit repeatedly updates the distance to be indicated according to the specified second position.

4. The projector according to claim 1, wherein:
the predetermined pattern contains a first region and a second region alternately disposed and having different intensities of predetermined color component.

5. The projector according to claim 1, wherein:
the condition indicating unit updates the adjustment image to an image containing a condition indicating portion representing the specified focusing condition and a portion showing the predetermined pattern to indicate the focusing condition.

6. The projector according to claim 1, further comprising:
an indication device,
wherein the condition indicating unit indicates the focusing condition on the indication device.

7. The projector according to claim 1, wherein:
the condition indicating unit displays, as part of the adjustment image, a variable indicative of a current focusing condition.

8. The projector according claim 1, wherein:
the condition indicating unit displays, as part of the adjustment image, a graph indicative of a current focusing condition.

9. The projector according claim 1, wherein:
the adjustment image projection unit projects the adjustment image in response to the focus adjusting unit adjusting the focus.

10. The projector according to claim 2, wherein:
the index shows
(A) intensity of a predetermined color component represented by the image data and obtained in a predetermined range of spatial frequency, and
(B) degree of contrast in the image data.

11. The projector according to claim 3, wherein:
the condition indicating unit further indicates which of the first position and the second position is closer to the projector.

12. A projector which projects projection light representing an image onto a projection surface, comprising:
a focus adjusting unit which adjusts focus of a projected image according to manual operation;
an adjustment image projecting unit which projects an adjustment image containing a portion representing a predetermined pattern on the projection surface;
an imaging unit which captures the adjustment image;
a specifying unit which specifies a focusing condition of the adjustment image by analyzing image data of the adjustment image captured by the imaging unit; and
a condition indicating unit which displays the specified focusing condition,
wherein the adjustment image projecting unit projects the adjustment image in response to manual operation of the focus adjusting unit and stops projecting the adjustment image if a detection unit detects no movement during passage of a predetermined time after the last manual operation for the focus adjusting unit, and
wherein the adjustment image includes:
a first portion that indicates the specified focusing condition numerically, and a second portion that shows the predetermined pattern to indicate the focusing condition.

13. A method for controlling a projector which projects projection light representing an image onto a projection surface and includes a focus adjusting unit for shifting focus of the projection light according to manual operation, comprising:

projecting onto the projection surface an adjustment image containing a portion representing a predetermined pattern;

capturing the adjustment image to produce image data;

specifying a focusing condition of the adjustment image by analyzing the image data; and displaying the specified focusing condition as part of the adjustment image, wherein the adjustment image is projected in response to manual operation of the focus adjusting unit and projection of the adjustment image is stopped if a detection unit detects no movement during passage of a predetermined time after the last manual operation for the focus adjusting unit, and wherein the adjustment image includes:

a first portion that indicates the specified focusing condition numerically, and a second portion that shows the predetermined pattern to indicate the focusing condition.

14. The method according to claim 13, further comprising:

determining whether an ending condition to cease projecting the adjustment image is satisfied; and stopping a projection of the adjustment image when the ending condition is satisfied.

15. The method according to claim 14, wherein the ending condition is passage of the predetermined time after the last manual operation for the focus adjusting unit.

* * * * *